July 19, 1927.
H. C. TOOMEY
1,636,536
SPREADING OR SOWING MACHINE FOR ROOT PLANTING
Filed Oct. 9, 1924
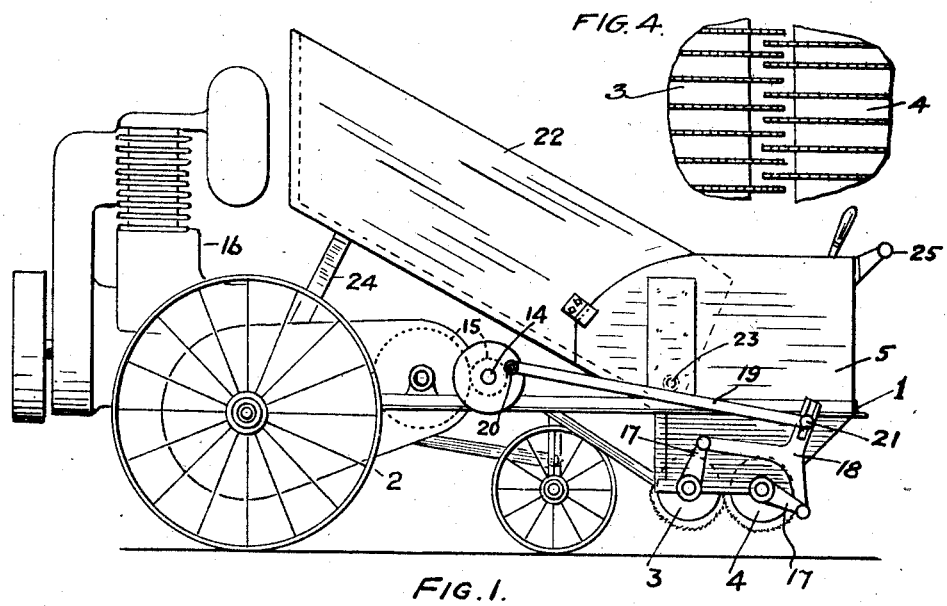
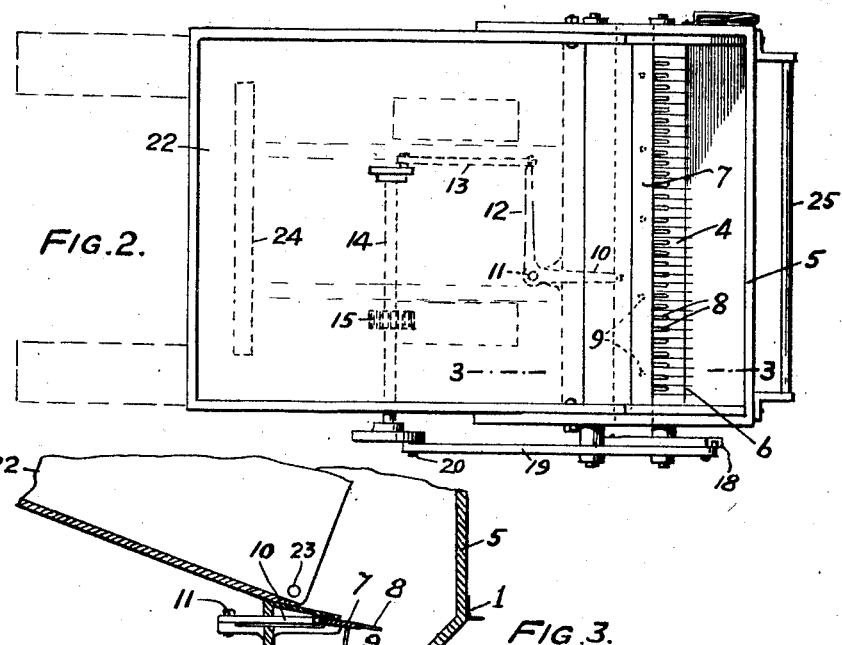
WITNESS:
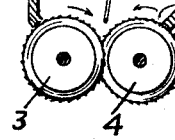
INVENTOR
Howard C. Toomey
BY
Augustus B. Stoughton
ATTORNEY.

Patented July 19, 1927.

1,636,536

UNITED STATES PATENT OFFICE.

HOWARD C. TOOMEY, OF PHILADELPHIA, PENNSYLVANIA.

SPREADING OR SOWING MACHINE FOR ROOT PLANTING.

Application filed October 9, 1924. Serial No. 742,512.

In the planting of bent grass, sods are torn and cut apart to provide stolons, joints or cut pieces which are planted by first spreading them on the surface of the ground and then covering them with top dressing.

The principal object of the present invention is to provide a machine for spreading stolons, joints or cut pieces satisfactorily upon the surface of the ground while at the same time the machine may be propelled by power. Another object of the invention is to construct and provide mechanism which will properly distribute the cut material and sow it evenly on the surface of the ground even though the machine be propelled by power and therefore operated more rapidly than would be the case if it were otherwise propelled. Other objects of the invention will appear from the following description at the end of which the invention will be claimed.

One embodiment of the invention is illustrated in the accompanying drawing forming part hereof and in which—

Figure 1 is a side elevation.

Fig. 2 is a top or plan view of the part of the machine shown at the right hand in Fig. 1, Fig. 3 is a sectional view taken on the line 3—3 of Fig. 2, Fig. 4 is a top or plan view of a portion of the parts illustrating a detail of construction.

In the drawings 1 is a frame mounted on or connected with an automotive carriage 2. 3 and 4 are a pair of rolls turnably mounted in the frame and provided with rows of overlapping teeth, more specifically, the rolls are provided with disks which overlap and the disks are provided with teeth disposed at their circumferences and which may therefore be described as overlapping, as disclosed in Fig. 4. 5 is a hopper mounted on the frame and having its bottom and outlet opening 6 disposed at the bight of the rolls. 7 is an agitator at the outlet opening of the hopper and it is provided with two sets of pins of which one set, 8, project generally horizontally over the rolls and of which the other set, 9, is less numerous and project generally vertically down toward the space between the rolls sometimes referred to as the bight between or of the rolls. As shown the agitator consists of a bar afforded a range of endwise oscillating motion or movement crosswise of the frame. This bar is operated upon by one end 10 of a bell crank lever pivoted at 11 and of which the other arm 12 is connected by the link 13 with a crank pin on the end of a shaft 14 rotated by gearing 15 from the power means 16 which propels the machine. The rolls 3 and 4 are turned first in one direction and then in the other direction through the medium of crank arms 17 with which is connected a lever 18, and the lever 18 is connected by a link 19 with a crank pin 20 on the shaft 14. 21 is a means by which the throw of the lever 18 may be adjusted in order to increase or decrease the length of the arc of reciprocation of the rolls 3 and 4. 22 is a feed chute delivering into the hopper 5 and it is pivoted at 23 so that it can be turned clockwise in Fig. 1 in respect to its support 24 in order to dump material or residual material into the hopper. 25 is a handle by which a person walking behind the machine may guide it as it is propelled forward by the power means.

In use the cut material, falling from the chute 22 into the hopper, is loosened up and distributed across the width of the machine by the agitator 7 and is fed evenly through the hopper to the rolls 3 and 4. The teeth of these rolls nag this material and deliver it upon the ground. The rolls nag the material because their teeth are like saw teeth and because one is turning in the direction to feed while the other is turning in the opposite direction preparatory to feeding. The power means not only propels the vehicle or machine as a whole but also operates the moving parts of the feed and distribution mechanism so that all that the operator or attendant is required to do is to walk behind the machine and guide it. Of course it is necessary to replenish the supply of cut pieces of sod in the chute 22, and substantially all of this supply may be used by tipping up the chute.

It will be obvious to those skilled in the art that modifications may be made in details of construction, arrangement and matters of mere form without departing from the spirit of the invention which is not limited to such matters or otherwise than as the prior art and the appended claims may require.

I claim:

1. An automotive spreading and sowing machine for root planting comprising a power means for propelling the machine, a pair of rotatively mounted rolls provided with circumferential spaced rows of saw teeth and the teeth of one roll projecting into the spaces between the rows of teeth of the other roll, a hopper having at its bottom an outlet opening disposed at the space between the rolls, an agitator provided with pins and arranged for horizontal reciprocation in the hopper above the bight of the rolls, and mechanism actuated by the power means for turning the rolls oppositely and first in one direction and then in the other and for reciprocating the agitator endwise in horizontal direction.

2. A machine of the type specified including a hopper, spaced pins arranged for reciprocation in a horizontal direction and disposed at the mouth of the hopper, spaced circular rows of teeth of which the teeth project into the spaces between the rows, and means for oscillating the rows of teeth in opposite directions and for reciprocating the pins.

3. An automotive spreading and sowing machine for root planting comprising a power means for propelling the machine, a pair of rotatively mounted rolls provided with circumferential spaced rows of saw teeth and the teeth of one roll projecting into the spaces between the rows of teeth of the other roll, a hopper having at its bottom an outlet opening disposed at the space between the rolls, an agitator mounted for horizontal reciprocation at the outlet opening of the hopper and provided with two sets of pins of which one set projects horizontally over the rolls and of which the other set projects generally downward toward the space between the rolls, and mechanism actuated by the power device for reciprocating the agitator endwise in horizontal direction and for turning the rolls oppositely first in one direction and then in the other direction.

HOWARD C. TOOMEY.